United States Patent [19]
Westerberg

[11] 4,257,489
[45] Mar. 24, 1981

[54] PRESSURE FLUID POWERED MACHINE TOOL

[75] Inventor: Sven P. J. Westerberg, Saltsjöbaden, Sweden

[73] Assignee: Atlas Copco Aktiebolag, Nacka, Sweden

[21] Appl. No.: 967,219

[22] Filed: Dec. 7, 1978

[30] Foreign Application Priority Data

Dec. 7, 1977 [SE] Sweden ............... 7713874

[51] Int. Cl.³ .............................. B23Q 5/00; E21C 500
[52] U.S. Cl. ........................................ 173/159; 173/19
[58] Field of Search ........................... 173/159, 19, 139; 91/304, 10, 9, 17; 408/355, 130

[56] References Cited

U.S. PATENT DOCUMENTS

| | | | |
|---|---|---|---|
| 2,605,751 | 8/1952 | Perry et al. | 91/355 X |
| 2,607,197 | 8/1952 | Johnson | 91/355 X |
| 2,854,870 | 10/1958 | Chaffee et al. | 173/159 |
| 3,141,509 | 7/1964 | Bent | 173/19 |
| 3,195,658 | 7/1965 | Reed et al. | 173/19 |
| 3,266,580 | 8/1966 | Clapp et al. | 408/130 |
| 4,111,590 | 9/1978 | Burkart et al. | 408/130 |

FOREIGN PATENT DOCUMENTS 956081   4/1964   United Kingdom ............... 173/19

Primary Examiner—Ronald Feldbaum
Attorney, Agent, or Firm—Frishauf, Holtz, Goodman & Woodward

[57] ABSTRACT

A pressure fluid powered machine tool comprising a rotary motor unit displaceably guided in a cylinder bore of a housing to accomplish a combined rotary and linear movement of a working tool such as a drilling or tapping tool. The motor unit is provided with an external pressure fluid supply tube which is rigidly connected to the motor unit in a parallel offset position and which cooperates with a pressure chamber in the housing to establish a controlled fluid communication between the housing and the motor unit. The feed tube also serves as a torque reaction support bar by means of which the torque reaction arising in the motor unit is transferred to the housing.

13 Claims, 2 Drawing Figures

PRESSURE FLUID POWERED MACHINE TOOL

BACKGROUND OF THE INVENTION

The present invention relates to a pressure fluid powered machine tool of the type having a motor unit displaceably guided in a cylinder bore of a housing. Such machine tools are preferably used for drilling, tapping and like purposes where a rotating output shaft in combination with a linear feed movement is required.

It is an object of the invention to provide a machine tool of the above type in which the pressure fluid feed means of the motor unit is simplified as regards construction as well as operation and handling.

It is a further object of the invention to provide a machine tool of the above type having an improved and simplified motor unit pressure fluid feed means which comprises a valve means for controlling the pressure fluid supply in response to the axial position of the motor unit.

It is still a further object of the invention to provide a pressure fluid powered machine tool of the above described type in which a novel type of pressure fluid feed means for the motor unit is utilized as a torque reaction transferring means between the motor unit and the machine housing.

Other objects and advantages will be apparent from the following specification.

DETAILED DESCRIPTION

Figure 1:
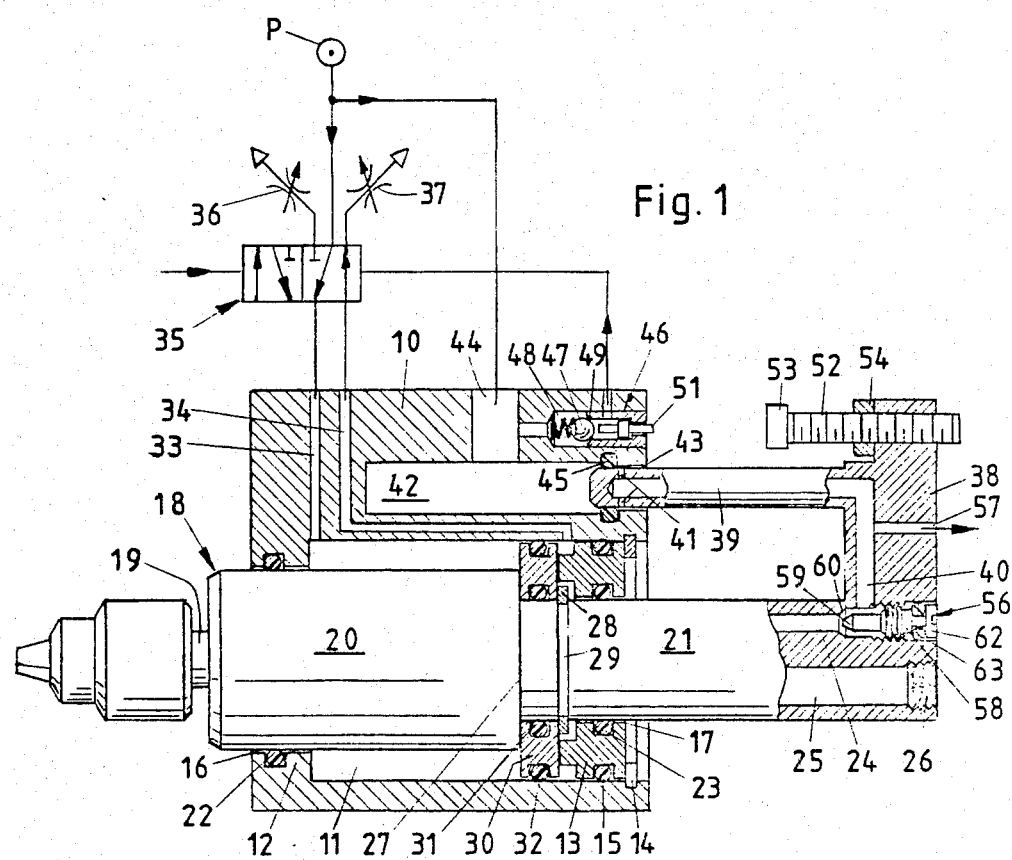
FIG. 1 shows a partly broken side elevation of a pneumatically powered drilling machine according to the invention.
Figure 2:
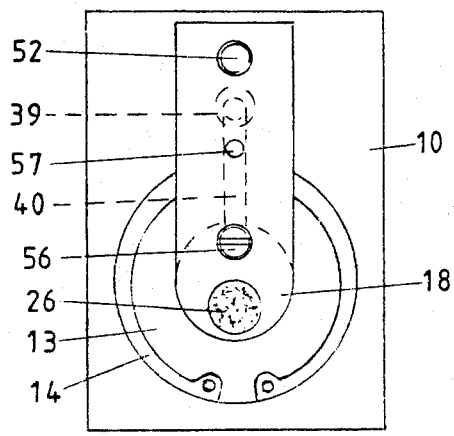
FIG. 2 shows the machine in FIG. 1 viewed from its rear end, i.e. from right to left in FIG. 1.

In the figures, 10 designates the machine housing which accommodates a cylinder bore 11 axially confined by a forward end wall 12 and a rear end wall 13. The forward end wall 12 is formed in one piece with the housing 10, whereas the rear end wall 13 is removable from the housing 10 but is kept in place by a lock ring 14.

The rear end wall 13 is sealed off relative to the housing 10 by means of an O-ring 15. The end walls 12, 13 have cylindrical, central openings 16,17 to receive a motor unit 18 therethrough. The motor unit 18 comprises a pneumatic vane motor and a power transmission, which parts are of a conventional design and are therefore not shown in detail. At its forward end, the motor unit 18 rotatively supports an output shaft 19 for connection of, for instance, a drill chuck.

Exteriorly, the motor unit 18 comprises two cylindrical parts 20, 21 of different diameter. The forward, wider part 20 is guidingly received in the opening 16 of the forward end wall 12 and is sealed off by an O-ring 22.

The rear, slimmer part 21 is guidingly received in the central opening 17 of the rear end wall 13 and is sealed off by an O-ring 23.

The rear part 21 of the motor unit 18 comprises a pressure air inlet passage 24 and an outlet passage 25, both communicating with the non-disclosed vane motor. At its discharge end, the outlet passage 25 is provided with a noise muffler 26 of a porous material.

Between a shoulder 27, which separates its two cylindrical parts 21,22, and a lock ring 28 secured in an external groove 29 on its slimmer part 21, the motor unit 18 carries an annular piston 30. The latter is sealed off internally by an O-ring 31 cooperating with part 21 and externally by an O-ring 32 which engages the cylinder bore 11 of the housing 10.

In the housing 10, there are two fluid passages 33, 34 connecting one end each of the cylinder bore 11 to an external control valve 35. The latter is in turn connected to a pressure air source P and to two adjustable outlets 36, 37. By shifting the control valve 35, pressure air is alternatively supplied to and discharged from each end of the cylinder bore 11, whereby the motor unit 18 is moved forwards or backwards relative to the housing 10.

At its rear end, the motor unit 18 is provided with a connection head 38 which extends laterally from the longitudinal axis of the motor unit 18 and which supports, in an offset parallel relationship to the latter, a pressure air feed tube 39. This tube 39 is rigidly connected to the connection head 38 and communicates with a fluid passage 40 in the latter. At its forward, free end, the feed tube 39 is axially closed but has a number of radial openings 41.

In FIG. 1, the feed tube 39 is shown as being in one piece with the connection head 38. However, it is to be understood that the feed tube 39 is manufactured separately but is connected to the connection head 38 in such a way, for instance by hard soldering or a press fit, as to constitute a rigid part of the latter.

The feed tube 39 is sealingly received in a pressure chamber 42 in the housing 10. The pressure chamber 42 extends parallelly with cylinder bore 11 and is continuously connected to a pressure air source via an inlet opening 44. At its rear end, the pressure chamber 42 comprises a coaxial portion 43 of smaller diameter. This portion forms a guide bore for the feed tube 39 and has an O-ring 45 to seal off the clearance between the chamber wall and the feed tube 39.

The feed tube 39 serves not only as a pressure fluid communication means between the motor unit 18 and the pressure chamber 42 but also as a reaction support bar for transferring torque reaction from the motor unit 18 to the housing 10. The feed tube or reaction support bar 39, thereby, co-operates with the guide bore 43.

In the housing 10, there is also lodged a return valve 46, which, when activated, directs pressure air to the control valve 34, thereby making the latter occupy its left hand position and, thereby, providing for a rearwardly directed force on piston 30 and the motor unit 18.

The return valve 46 comprises a ball 47 biased by a spring 48 against a seat 49. A maneuver rod 51 extends rearwardly out of the housing 10 so as to be activatable to move the ball 47 from the seat 49 against the load of the spring 48.

On the connection head 38, there is mounted by a thread joint an adjustable, stroke length determining stop screw 52 which has a flat head 53 for co-operation with the maneouver rod 51 of the return valve 46. The stop screw 52 is provided with a lock nut 54.

Moreover, the connection head 38 comprises an adjustable flow restricting valve 56 for controlling the pressure air supply to the vane motor of the motor unit 18, and a signal outlet 57. The flow restricting valve 56 comprises a screw 58 formed with a tapered end 59, and a seat 60. The screw 58 has a slotted head 62 to be engaged by a screw driver. Under its head 62, the screw 58 carries an O-ring 63 for preventing air leakage past the screw 58.

When supplying pressure air to the above described machine tool, the following operation order will be the result:

In the position shown in FIG. 1, the motor unit 18 occupies its rear end or home position, and the control valve 35 is in its lefthand position passing pressure air to the forward part of the cylinder bore 11 via passage 33, and thereby, makes the motor unit 18 maintain its rest position. In this position, the rear part of the cylinder bore 11 is connected to the atmosphere via passage 34 and the adjustable outlet restriction 37. Further, the radial openings 41 of the feed tube 39 are situated outside O-ring 45, which means that there is no communication between the pressure chamber 42 and the feed tube 39. So, the motor unit 18 does not receive any pressure air in its rest position, meaning that no rotation is obtained at the output shaft 19.

When shifting the control valve 35 to its right hand position, by manual activation or by directing a pressure fluid pulse onto its left hand end, the rear part of the cylinder bore 11 is supplied with pressure air via passage 34, while the forward part is vented to the atmosphere via restriction valve 36. The motor unit 18 now starts to move to the left at a speed determined by the outlet area set on the restriction valve 36.

As the motor unit 18 has moved a short distance from its right hand rest position, the radial openings 41 of the feed tube 39 passes the O-ring 45 and communication between the pressure chamber 42 and the feed tube 39 is established. Pressure air starts to flow through feed tube 39, passage 40, valve 56 and inlet passage 24, whereby the output shaft 19 and the drill chuck starts to rotate at a speed determined by the setting of restriction valve 56. Exhaust air leaves the motor unit 18 through outlet passage 25 and noise muffler 26. The desired length of the working stroke is determined by setting the stop screw 52. The machine is now able to perform a drilling operation.

The torque reaction generated in the motor unit 18 is transferred to the housing 10 by means of the feed tube 39. Thus, the feed tube 39 has a function not only to feed pressure air to the motor unit 18 but also to act as a reaction support bar.

As the end of the working stroke is reached, the head 53 of the stop screw 52 activates the manoeuver rod 51 of the return valve 46. The manoeuver rod 51 lifts the ball 47 off the seat 49 against the action of spring 48, thereby permitting pressure air from the inlet opening 44 to reach the right hand side of the control valve 35. The latter is then shifted back to the position shown in FIG. 1, in which the rear part of cylinder bore 11 is depressurized via outlet restriction 37 and pressure air is supplied to the forward part of the cylinder bore 11. The motor unit 18 now starts on its return stroke at a velocity determined by the setting of oulet restriction 37.

The radial openings 41 of the feed tube 39 have remained inside O-ring 45 during the working stroke as well as the return stroke, whereby the rotation of the output shaft 19 has not been interrupted. During the very last part of the return stroke, however, the openings 41 of the feed tube 39 pass to the outside of O-ring 45 and the communication between the feed tube 39 and the pressure chamber 42 is broken. Then, the rotation of the output shaft 19 stops. A complete, automatically controlled working cycle has been performed.

During the working and return strokes the signal outlet 57 has been pressurized, but, as the motor unit 18 is back in its rest position, the pressure ceases and a negative ready-signal may be obtained via signal outlet 57 for indication purposes.

An advantage gained by a machine according to the invention is that the novel type of pressure air feed means for supplying pressure air to the displaceable motor unit makes it possible to utilize a very simple and easy-to-handle speed control valve 56 for the rotation motor. It also makes it possible to incorporate a valve function for starting and stopping the motor rotation in response to the axial position of the motor unit.

Another advantage gained from the offset feed tube arrangement is the possibility to further simplify the construction by using the feed tube as a reaction support bar, thereby avoiding expensive spline means between the housing and the motor unit.

The embodiments of the invention are not limited to the shown and described example, but can be freely varied within the scope of the invention as it is defined in the claims.

What we claim is:

1. In a pressure fluid powered machine tool comprising:
   a housing (10) having a cylinder bore (11) therein,
   a motor unit (18) displaceably guided in said cylinder bore (11) and having at least a forward end extending out of said cylinder bore (11), said motor unit (18) comprising at its forward end an output shaft (19) for connection to a working tool,
   piston means (30) cooperatively coupled to said motor unit (18) and sealingly guided in said cylinder bore (11) for axial displacement of said motor unit (18) relative to said housing (10),
   the improvement comprising:
   a pressure chamber (42) in said housing (10) and extending in a parallel offset relationship to said cylinder bore (11), and
   a pressure fluid feed tube (39) rigidly connected at one end thereof to the motor unit (18) and extending in a parallel offset relationship to the motor unit, said feed tube being sealingly coupled to said pressure chamber (42), said feed tube (39) having an internal passage coupling said motor unit (18) and said pressure chamber (42) to thereby establish a fluid communication between said pressure chamber (42) and said motor unit (18).

2. Machine tool according to claim 1, wherein said pressure chamber (42) is continuously pressurized; and said pressure fluid feed tube (39) and pressure chamber (42) are provided with interacting valve means (41,45) for breaking said fluid communication between said pressure chamber (42) and said motor unit (18) at a predetermined axial position of said motor unit (18).

3. Machine tool according to claim 2, wherein said pressure fluid feed tube (39) has an end portion which at least partially enters said pressure chamber (48); and said valve means (41,45) comprises at least one inlet opening (41) on the pressure chamber entering portion of said feed tube (39) and a seal means (45) mounted in the housing (10) so as to seal off said at least one inlet opening (41) of said feed tube (39) from said pressure chamber (42) as said motor unit (18) occupies a predetermined axial position.

4. Machine tool according to claim 2 or 3, wherein said valve means (41,45) is arranged to break said fluid communication as the motor unit (18) occupies its rear end position.

5. Machine tool according to anyone of claims 1, 2 or 3, wherein said motor unit (18) comprises a laterall extending connection head (38) which is rigidly connected to said feed tube (39), said connection head (38) including a fluid passage means (40) communicating at one end thereof with said passage of said feed tube (39) and at the other end thereof with the motor unit (18), and an adjustable flow restricting valve (56) coupled to said passage means (40) for controlling the fluid flow through said fluid passage means (40).

6. Machine tool according to anyone of the claims 1, 2 or 3, wherein said feed tube (39) is arranged to transfer torque reaction from said motor unit (18) to said housing (10).

7. Machine tool according to claim 5, wherein said motor unit (18) has a rear end which extends out of said cylinder bore (11), and said connection head (38) is located at the rear end of the motor unit (18).

8. In a pressure fluid powered machine tool comprising:
   a source of pressure fluid,
   a housing (10) having a cylinder bore (11),
   a motor unit (18) displaceably guided in said cylinder bore (11) and having at least a forward end extending out of said cylinder bore (11), said motor unit (18) comprising at its forward end an output shaft (19) for connection to a working tool,
   a piston means (30) cooperatively coupled to said motor unit (18) and sealingly guided in said cylinder bore (11) for axial displacement of said motor unit (18) relative to said housing (10),
   the improvement comprising:
   a reaction support bar (39) rigidly connected to said motor unit (18) in a parallel offset relationship thereto,
   said housing (10) comprising a guide bore (43) located in a parallel offset relationship to said cylinder bore (11) and being arranged to guidingly receive said reaction support bar (39), and
   a pressure chamber (42) associated with said guide bore (43) and communicating with a pressure fluid source,
   said reaction support bar (39) comprising fluid passage means (41) for establishing fluid communication between said pressure chamber (42) and said motor unit (18).

9. Machine tool according to claim 4, wherein said motor unit (18) comprises a laterally extending connection head (38) which is rigidly connected to said feed tube (39), said connection head (38) including a fluid passage means (40) communicating at one end thereof with said passage of said feed tube (39) and at the other end thereof with the motor unit (18), and an adjustable flow restricting valve (56) coupled to said passage means (40) for controlling the fluid flow through said fluid passage means (40).

10. Machine tool according to claim 9, wherein said feed tube (39) is arranged to transfer torque reaction from said motor unit (18) to said housing (10).

11. Machine tool according to claim 4, wherein said feed tube (39) is arranged to transfer torque reaction from said motor unit (18) to said housing (10).

12. Machine tool according to claim 5, wherein said feed tube (39) is arranged to transfer torque reaction from said motor unit (18) to said housing (10).

13. Machine tool according to claim 12, wherein said motor unit has a rear end which extends out of said cylinder bore (11), and said connection head (38) is located at the rear end of the motor unit (18).

* * * * *